United States Patent
Cosoi et al.

(10) Patent No.: US 8,131,655 B1
(45) Date of Patent: Mar. 6, 2012

(54) SPAM FILTERING USING FEATURE RELEVANCE ASSIGNMENT IN NEURAL NETWORKS

(75) Inventors: Alexandru C Cosoi, Buzau (RO); Madalin S Vlad, Bucharest (RO); Valentin Sgarciu, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 743 days.

(21) Appl. No.: 12/130,630

(22) Filed: May 30, 2008

(51) Int. Cl.
*G06F 15/18* (2006.01)

(52) U.S. Cl. .......................................................... 706/12
(58) Field of Classification Search ..................... 706/12
See application file for complete search history.

(56) References Cited

U.S. PATENT DOCUMENTS

| | | | |
|---|---|---|---|
| 4,914,708 A | 4/1990 | Carpenter et al. |
| 5,040,214 A | 8/1991 | Grossberg et al. |
| 5,133,021 A | 7/1992 | Carpenter et al. |
| 5,142,590 A | 8/1992 | Carpenter et al. |
| 5,157,738 A | 10/1992 | Carpenter et al. |
| 5,214,715 A | 5/1993 | Carpenter |
| 5,218,646 A | 6/1993 | Sirat et al. |
| 5,311,601 A | 5/1994 | Carpenter |
| 5,619,619 A | 4/1997 | Shinohara et al. |
| 5,680,475 A | 10/1997 | Zwierski et al. |
| 6,161,130 A | 12/2000 | Horvitz et al. |
| 6,415,286 B1 | 7/2002 | Passera et al. |
| 6,654,787 B1 | 11/2003 | Aronson |
| 7,130,850 B2 | 10/2006 | Russell-Falla |
| 7,257,564 B2 | 8/2007 | Loughmiller |
| 7,751,620 B1 | 7/2010 | Cosoi |
| 7,945,627 B1 | 5/2011 | Musat |
| 8,010,614 B1 | 8/2011 | Musat et al. |
| 8,051,139 B1 | 11/2011 | Musat |
| 8,065,379 B1 | 11/2011 | Musat |
| 2004/0177110 A1 | 9/2004 | Rounthwaite et al. |
| 2004/0260776 A1 | 12/2004 | Starbuck et al. |
| 2005/0076084 A1 | 4/2005 | Loughmiller et al. |
| 2005/0193073 A1 | 9/2005 | Mehr et al. |
| 2006/0015563 A1 | 1/2006 | Judge |

OTHER PUBLICATIONS

Cosoi, Catalin "An Anti-Spam Filter Based on Adaptive Neural Networks," 2006, MIT Spam Conference.*
Carpenter, G., et. al., Artmap: Supervised Real-Time Learning and Classification of Nonstationary Data by a Self-Organizing Neural Network, Neural Networks, 1991, p. 565-588, vol. 4, Pergamon Press, USA.
Cosoi, C., An Anti-Spam Filter Based on Adaptive Neural Networks, 2006, p. 1-8, MIT Spam Conference, www.spamconference.org.

(Continued)

*Primary Examiner* — Michael B Holmes
(74) *Attorney, Agent, or Firm* — Law Office of Andrei D Popovici, PC

(57) ABSTRACT

In some embodiments, a spam filtering method includes computing a pattern relevance for each of a set of message feature patterns, and using a neural network filter to classify incoming messages as spam or ham according to the pattern relevancies. Each message feature pattern is characterized by the simultaneous presence within a message of a specific set of message features (e.g., the presence of certain keywords within the message body, various message header heuristics, various message layout features, etc.). Each message feature may be spam- or ham-identifying, and may receive a tunable feature relevance weight from an external source (e.g. data file and/or human operator). The external feature relevance weights modulate the set of neuronal weights calculated through a training process of the neural network.

16 Claims, 9 Drawing Sheets

OTHER PUBLICATIONS

Cosoi, U.S. Appl. No. 11/497,662, filed Aug. 1, 2006, "Adaptive Spam Filtering Systems and Methods".

Cosoi, U.S. Appl. No. 11/867,547, filed Oct. 4, 2007, "Systems and Methods for Dynamically Integrating Heterogeneous Anti-Spam Filters".

Cosoi, U.S. Appl. No. 11/967,563, filed Dec. 31, 2007, "Systems and Methods for Electronic Fraud Prevention".

USPTO, Office Action mailed Mar. 18, 2011 for U.S. Appl. No. 11/967,563, filed Dec. 31, 2007.

USPTO, Office Action mailed Jun. 23, 2010 for U.S. Appl. No. 11/867,547, filed Oct. 4, 2007.

USPTO, Office Action mailed Apr. 18, 2011 for U.S. Appl. No. 11/497,662, filed Aug. 1, 2006.

USPTO, Office Action mailed Sep. 17, 2010 for U.S. Appl. No. 11/497,662, filed Aug. 1, 2006.

USPTO, Office Action mailed Mar. 9, 2010 for U.S. Appl. No. 11/497,662, filed Aug. 1, 2006.

USPTO, Office Action mailed Aug. 20, 2009 for U.S. Appl. No. 11/497,662, filed Aug. 1, 2006.

Cosoi, "Methods for Dynamically Combining Relevancies of Different Antispam Filters," 2007 MIT Spam Conference, Boston MA, p. 1-10, Mar. 30, 2007.

Cukier et al., "Genres of Spam: Expectations and Deceptions," Proceedings of the 39th Hawaii International Conference on System Sciences, p. 1-10, Kauai, HI, Jan. 7, 2006.

Carpenter et al., "Adaptive Resonance Theory," The Handbook of Brain Theory and Neural Networks, Second Edition, MIT Press, Cambridge, MA, p. 1-12, 2003; the year of publication is sufficiently earlier than the effective U.S. filing date and any foreign priority date so that the particular month of publication is not in issue.

Androtsopoulos, "Learning to Filter Spam: A Comparison of Naive Bayesian and a Memory-Based Approach," Proc. Workshop "Machine Learning and Textual Information Access," 4th European Conference on Principles and Practice of Knowledge Discovery in Databases, Lyon, France, p. 1-13, Sep. 2000.

Lundberg, "Uninvited, Unwelcome Medical Email Messages," Medscape Today, www.medscape.com/viewarticle/465734?rss, WebMD, New York, NY, Posted Dec. 16, 2003.

Kerremans, Towards Ontology-Based E-mail Fraud Detection, Proc. EPIA, Covilha, Portugal, p. 106-111, 2005; the year of publication is sufficiently earlier than the effective U.S. filing date and any foreign priority date so that the particular month of publication is not in issue.

Tan, "Adaptive Resonance Associative Map: A Hierarchical ART System for Fast Stable Associative Learning," IJCNN Conf. on Neural Networks, Baltimore MD, p. I-860-865, Jun. 1992.

Tan, "Cascade ARTMAP: Integrating Neural Computation and Symbolic Knowledge Processing," IEEE Trans. Neural Networks 8(2):237-250, IEEE, New York, NY, Mar. 1997.

Verzi, "Hierarchical ARTMAP," Proc. Int. Joint Conf. on Neural Networks, IJCNN2000, Como, Italy, p. 41-46, Jul. 2000.

Weenink, "Category ART: A Variation on Adaptive Resonance Theory Neural Networks," Proc. Inst. Phonetic Sci., Univ. Of Amsterdam, Amsterdam, Netherlands, 21:117-129, 1997; the year of publication is sufficiently earlier than the effective U.S. filing date and any foreign priority date so that the particular month of publication is not in issue.

Miller, "Neural Network-Based Antispam Heuristics," Symantec Enterprise Security white paper, p. 1-8, Symantec, Mountain View, CA, 2003; the year of publication is sufficiently earlier than the effective U.S. filing date and any foreign priority date so that the particular month of publication is not in issue.

* cited by examiner

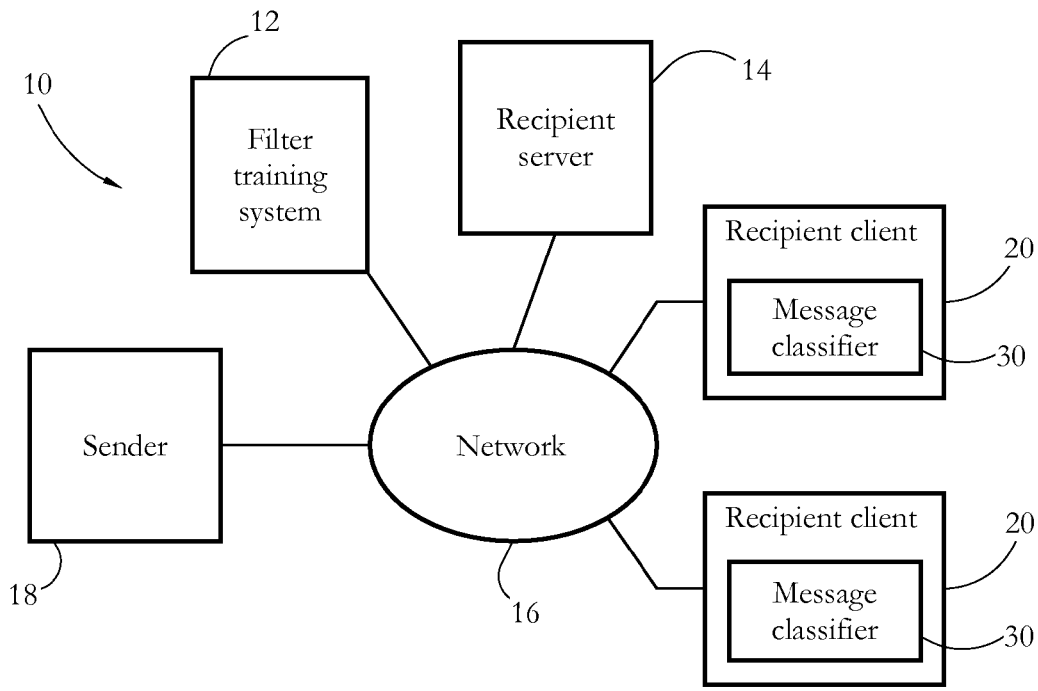
FIG. 1-A
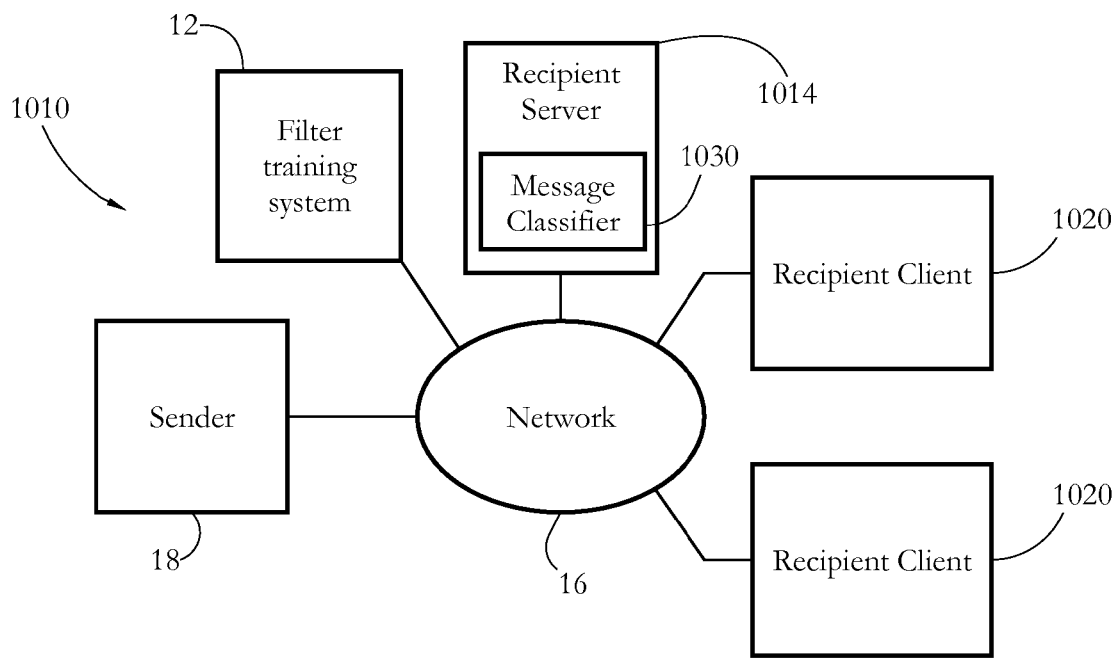
FIG. 1-B

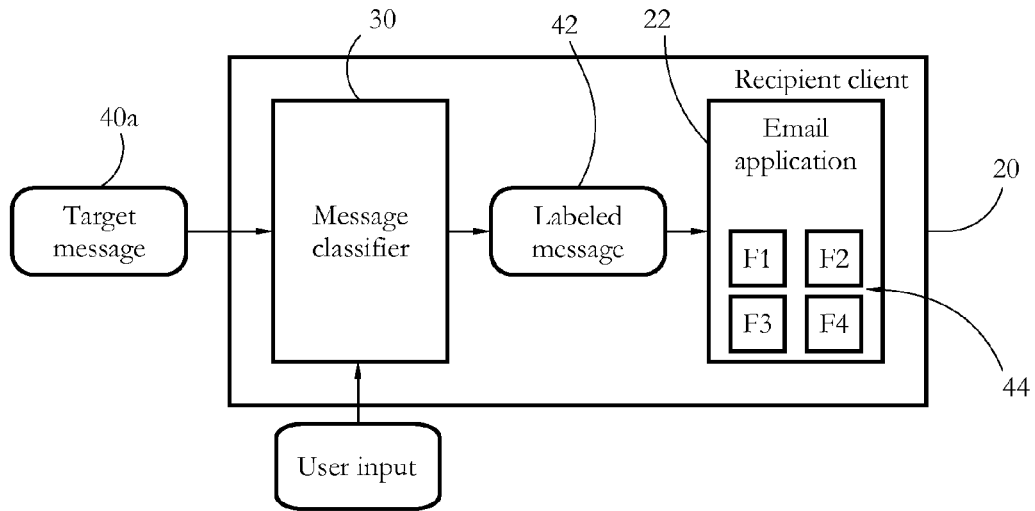
FIG. 2-A
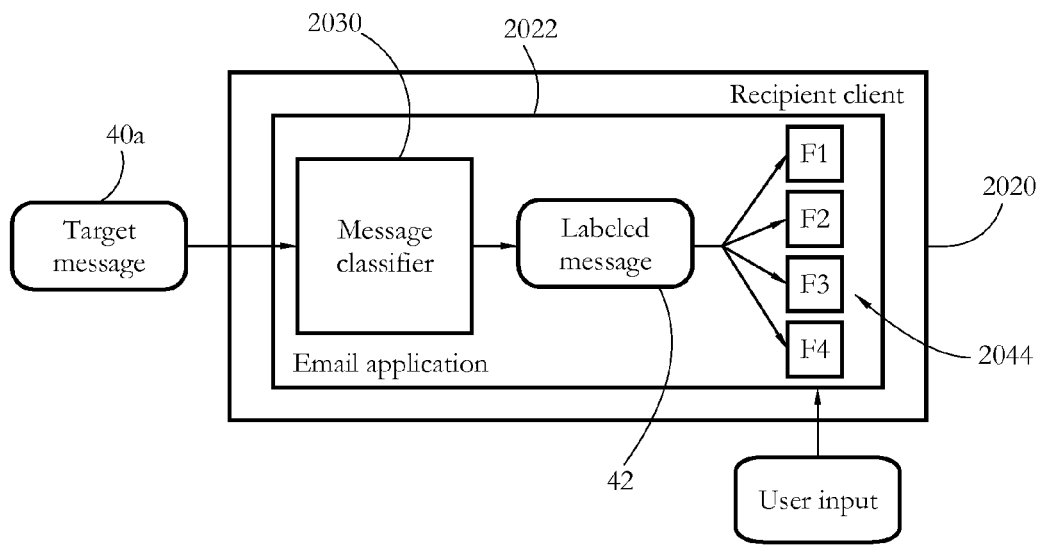
FIG. 2-B

SPAM FILTERING USING FEATURE RELEVANCE ASSIGNMENT IN NEURAL NETWORKS

BACKGROUND

The invention relates to methods and systems for classifying electronic communications, and in particular to systems and methods for filtering unsolicited commercial electronic mail (spam).

Unsolicited commercial electronic communications have been placing an increasing burden on the users and infrastructure of electronic mail (email), computer messaging, and phone messaging systems. Unsolicited commercial communications, also known as spam, forms a significant percentage of all email traffic worldwide. Spam takes up valuable network resources, affects office productivity, and is considered annoying, intrusive, and even offensive by many computer users.

Software running on an email user's or email service provider's system may be used to classify email messages as spam or non-spam (also called ham). Current methods of spam identification include matching the message's originating address to lists of known offending or trusted addresses (techniques termed black- and white-listing, respectively), and searching for certain words or word patterns (e.g. refinancing, Viagra®, weight loss).

Spammers constantly develop countermeasures to such anti-spam methods, which include misspelling certain words (e.g. Vlagra), using digital images instead of words, and inserting unrelated text in spam messages (also called Bayes poison). Spam identification may be further complicated by frequent changes in the form and content of spam messages.

Some spam identification systems use neural network filters. Neural network filters can be trained to learn a set of frequently occurring patterns of spam identifying features (e.g., the presence of certain keywords within the message body), and are able to pro-actively combine multiple spam heuristics. In some instances, neural network training processes and associated filtering may produce sub-optimal spam-identification results.

SUMMARY

According to one aspect, a spam filtering method comprises: computing a set of pattern relevancies for a set of feature patterns, wherein at least one pattern relevance of the set of pattern relevancies is computed according to a set of feature relevance weights determined through a process external to neuronal training; and classifying a target message as spam or ham according to a result of a processing of the target message by a neural network filter according to the set of pattern relevancies.

According to another aspect, an electronic message classification comprises: a training classifier configured to compute a set of pattern relevancies for a set of feature patterns, wherein at least one pattern relevance of the set of pattern relevancies is computed according to a set of feature relevance weights determined through a process external to neuronal training; and a neural network filter configured to classify a target message as spam or ham according to the set of pattern relevancies.

According to another aspect, a spam filtering method comprises: receiving a first set of neuronal weights, wherein the first set of neuronal weights is computed through a process of neuronal training; receiving a second set of neuronal weights, wherein the second set of neuronal weights is computed through a process external to neuronal training; and classifying a target message as spam or ham according to a result of a processing of the target message by a neural network filter according to the first and second sets of neuronal weights.

According to another aspect, a spam filtering method comprises: computing a first set of neuronal weights through a process of neuronal training; determining a second set of neuronal weights through a process external to neuronal training; and configuring a neural network filter to classify a target message as spam or ham according to the first and second sets of neuronal weights.

BRIEF DESCRIPTION OF THE DRAWINGS

The foregoing aspects and advantages of the present invention will become better understood upon reading the following detailed description and upon reference to the drawings where:

FIGS. 1-A shows an exemplary electronic communication system including multiple client computers each having a message classification subsystem (e.g. application) according to some embodiments of the present invention.

FIG. 1-B shows an exemplary electronic communication system including a receiving server having a message classification subsystem capable of classifying messages sent to multiple clients, according to some embodiments of the present invention.

FIG. 2-A illustrates an exemplary classification subsystem distinct from an electronic mail application, according to some embodiments of the present invention.

FIG. 2-B illustrates an exemplary classification subsystem forming part of an electronic mail application, according to some embodiments of the present invention.

DETAILED DESCRIPTION OF PREFERRED EMBODIMENTS

Figure 3:
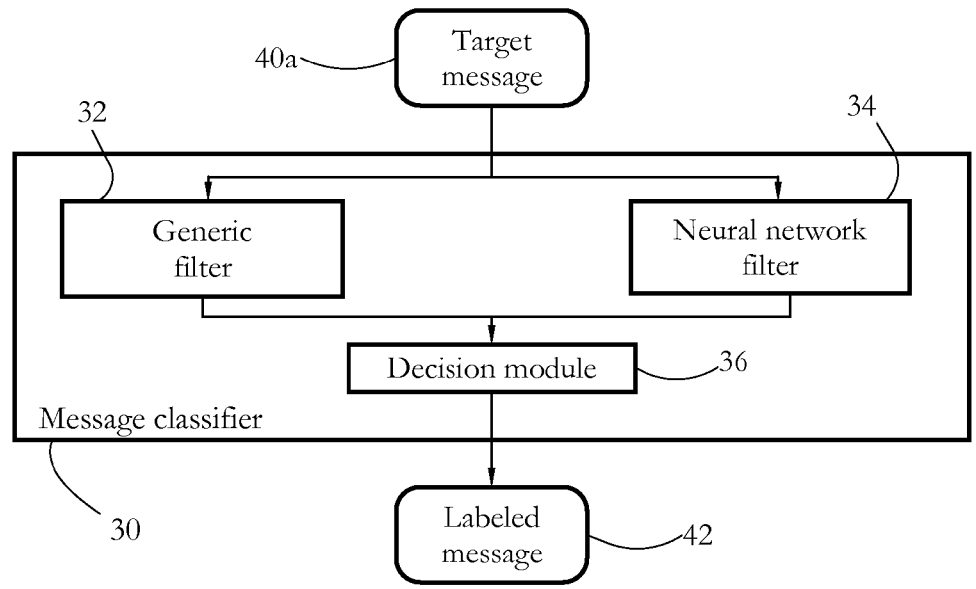
FIG. 3 shows a high-level diagram of a message classifier having a plurality of parallel message filters, according to some embodiments of the present invention.

In the following description, it is understood that all recited connections between structures can be direct operative connections or indirect operative connections through intermediary structures. A set of elements includes one or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise stated, processing an electronic communication encompasses processing data extracted from the electronic communication, such as a result of a parsing operation performed on the electronic communication. Unless otherwise specified, any referenced class may be a subclass of another class/subclass. Computer readable media encompass storage media such as magnetic, optic, and semiconductor media (e.g. hard drives, optical disks, flash memory, DRAM), as well as communications links such as conductive cables and fiber optic links. According to some embodiments, the present invention provides computer-readable media encoding instructions to perform the steps described herein.

The following description illustrates embodiments of the invention by way of example and not necessarily by way of limitation.

FIG. 1-A shows an electronic communication and classification system 10 according to some embodiments of the present invention. System 10 may be an electronic mail (email), instant messaging (IM), or other electronic communication system. For clarity, the following discussion will focus in particular on an electronic mail system. System 10 includes a sender computer system 18, a recipient server 14, a filter training system 12, and a plurality of recipient client systems 20. Sender system 18 may include a sender mail server and/or one or more sender client computer systems. Filter training system 12 may include an update server and one or more computer systems. Recipient client systems 20 may be personal computer systems, mobile telephones, personal digital assistants (PDA), or other electronic systems. For clarity, the following discussion will focus on recipient client systems 20 which are personal computer systems. A network 16 connects sender system 18, recipient server 14, filter training system 12, and recipient client systems 20. Network 16 may be a wide-area network such as the Internet. Parts of network 16, for example a part of network 16 interconnecting recipient client systems 20, may also include a local area network (LAN). Each recipient client system 20 includes a message classifier 30, which is used to classify electronic communications as described in detail below.

FIG. 1-B shows an electronic communication and classification system 1010 according to some embodiments of the present invention. System 1010 differs from the system 10 shown in FIG. 1-A in that a common message classifier 1030 is provided on a recipient server 1014. Recipient client systems 1020 receive pre-classified messages from server 1014, and do not include individual classification programs.

An email message sent by sender system 18 to one or more email addresses is received at recipient server 14, 1014, and then sent or made available otherwise (e.g. through a web interface) to recipient client systems 20, 1020. Message classifiers 30, 1030 assign the message to one of a plurality of classes according to a set of message features and a set of classifier parameters supplied by filter training system 12, as described in detail below. In some embodiments, the classes include one or more subclasses of unsolicited commercial email (spam), and one or more subclasses of non-spam (legitimate and/or unknown) email. In the configuration of FIG. 1-A, the message classification is performed individually on each recipient client system 20. In the configuration of FIG. 1-B, the message classification may be performed for multiple clients by a subsystem of recipient server 1014.

FIG. 2-A shows an exemplary recipient client computer system 20 including a message classifier 30 separate from an email application 22, according to some embodiments of the present invention. In some embodiments, message classifier 30 may be a stand-alone application, or may be an anti-spam module of a security suite having antivirus, firewall, and other modules. Message classifier 30 receives a target email message 40a, and generates a labeled (classified) message 42. Labeled message 42 may include a classification indicator (e.g. a class label such as spam/ham), which may be placed in a header field of labeled message 42. In some embodiments, message classifier 30 may generate a class label and an indicator of an association of the class label to target message 40a. Mail application 22 places labeled message 42 in one of a plurality of folders 44 (labeled F1-F4 in FIG. 2-A) according to the class label. Folders 44 may include one or more spam folders and one or more non-spam folders. A user may interact with message classifier 30 to manually alter the classification of given messages.

FIG. 2-B shows an exemplary recipient client computer system 2020 including a message classifier 2030 integrated in an email application 2022. Target message 40a received by message classifier 2030 is directed to one of a plurality of folders 2044 directly by message classifier 2030 or by other routines of mail application 2022. Folders 2044 may include one or more spam folders and one or more non-spam folders. A user may interact with email application 2022 to manually alter the classification of given messages, for example by moving the messages from one folder to another.

FIG. 3 shows a diagram of an exemplary message classifier 30 according to some embodiments of the present invention. Message classifier 30 includes a generic filter 32, a neural network filter 34, and a decision module 36 connected to generic filter 32 and neural network filter 34. Examples of generic filter 32 may include Bayes filters, black/white list filters, and image analysis filters, among others. Filters 32, 34 receive target message 40a, analyze the contents of message 40a using different methods, and generate corresponding classification indicators. In some embodiments, classification indicators generated by filters 32, 34 may include numerical scores and/or binary (e.g. yes/no, spam/ham) values. Decision module 36 receives the multiple classification indicators from filters 32, 34 and generates an integrated classification indicator (e.g., a class label) for target message 40a. In some embodiments of message classifier 30, a plurality of anti-spam filters may operate in sequence or in a parallel-sequential configuration, as opposed to the parallel configuration described in FIG. 3. In an exemplary sequential configuration, target message 40a may pass consecutively through a sequence of filters, and its classification indicator may be modified at each step according to the result of each filter.

Figure 4:
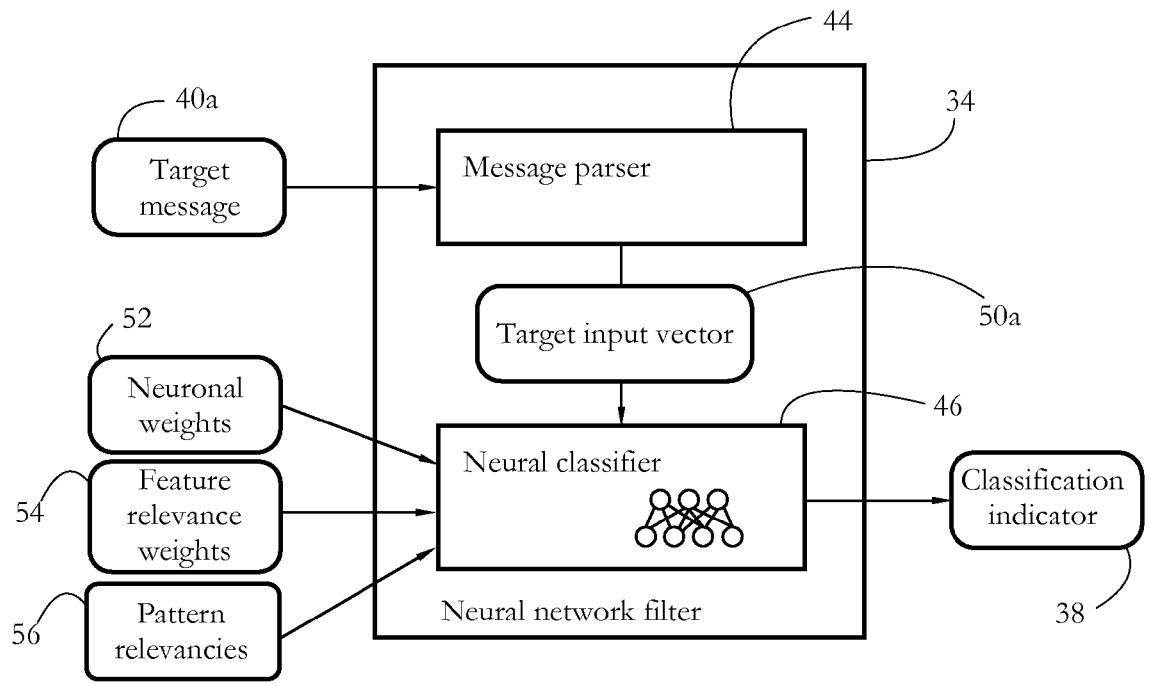
FIG. 4 shows a diagram of an exemplary neural network filter of FIG. 3, including a message parser and neural classifier, according to some embodiments of the present invention.

FIG. 4 shows a diagram of an exemplary neural network filter of FIG. 3, according to some embodiments of the present invention. Filter 34 comprises a message parser 44 and a neural classifier 46 connected to message parser 44. In some embodiments, message parser 44 receives target message 40a and produces a target input vector 50a, which is passed on to neural classifier 46. Neural classifier 46 receives target input vector 50a, a set of neuronal weights 52, a set of feature relevance weights 54, and a set of pattern relevancies 56, and outputs a classification indicator 38 for message 40a.

In some embodiments, neuronal weights 52, feature relevance weights 54, and pattern relevancies 56 are classifier parameters defined and/or computed via a training process performed by filter training system 12 (FIG. 1), as detailed below. Items 52, 54, and 56 may be delivered to message classifier 30 by periodic or on-demand software updates over network 16 (FIG. 1).

In some embodiments, target input vector 50a comprises a list of binary values $\vec{x} = \{x_2, \ldots, x_n\}$, wherein $x_i = 1, 0$ may indicate the presence (or absence, respectively) within target message 40a of the i-th feature of a predetermined ordered list of message features. Message features may include certain keywords (e.g. Viagra, some stock market symbols), certain character sequences or computer regular expressions (e.g. ta|4rget pr.ce, wherein "." may stand for any character and "|" may represent the logical OR), the existence and nature of message attachments, a certain format of the message headers, certain particularities of the message delivery date, the affiliation of the message sender to either a black or a white list of senders, and certain message layout features, among others. In some embodiments, message features may be spam-identifying (characteristic of spam messages), or ham-identifying (characteristic of non-spam messages), or both spam- and ham-identifying to various degrees, as discussed further below.

To construct input vector 50a, message parser 44 may verify the existence within message 40a of each item on the predetermined ordered list of message features. Additionally, message parser 44 may break up message 40a into formatting (e.g. MIME) parts and/or may extract and process information from the message headers (e.g., return the message ID, sender, and subject fields of the message). Some embodiments of message parser 44 may execute or interpret sections of computer code associated with target message 40a (e.g. HTML, XML or JavaScript commands), and/or may use commands, subroutines, or components belonging to recipient client system 20 (FIG. 1) to analyze the graphical layout of target message 40a.

In some embodiments, neural classifier 46 comprises a software-implemented neural network configured to assign target message 40a to one of a plurality of message classes based on the analysis of target input vector 50a. In some embodiments, neural classifier 46 implements a self-organized neural system, e.g. one based on Adaptive Resonance Theory (ART) and/or Adaptive Resonance Theory with Map Fields (ARTMAP). Both ART and ARTMAP are known neural network algorithms.

Figure 5:
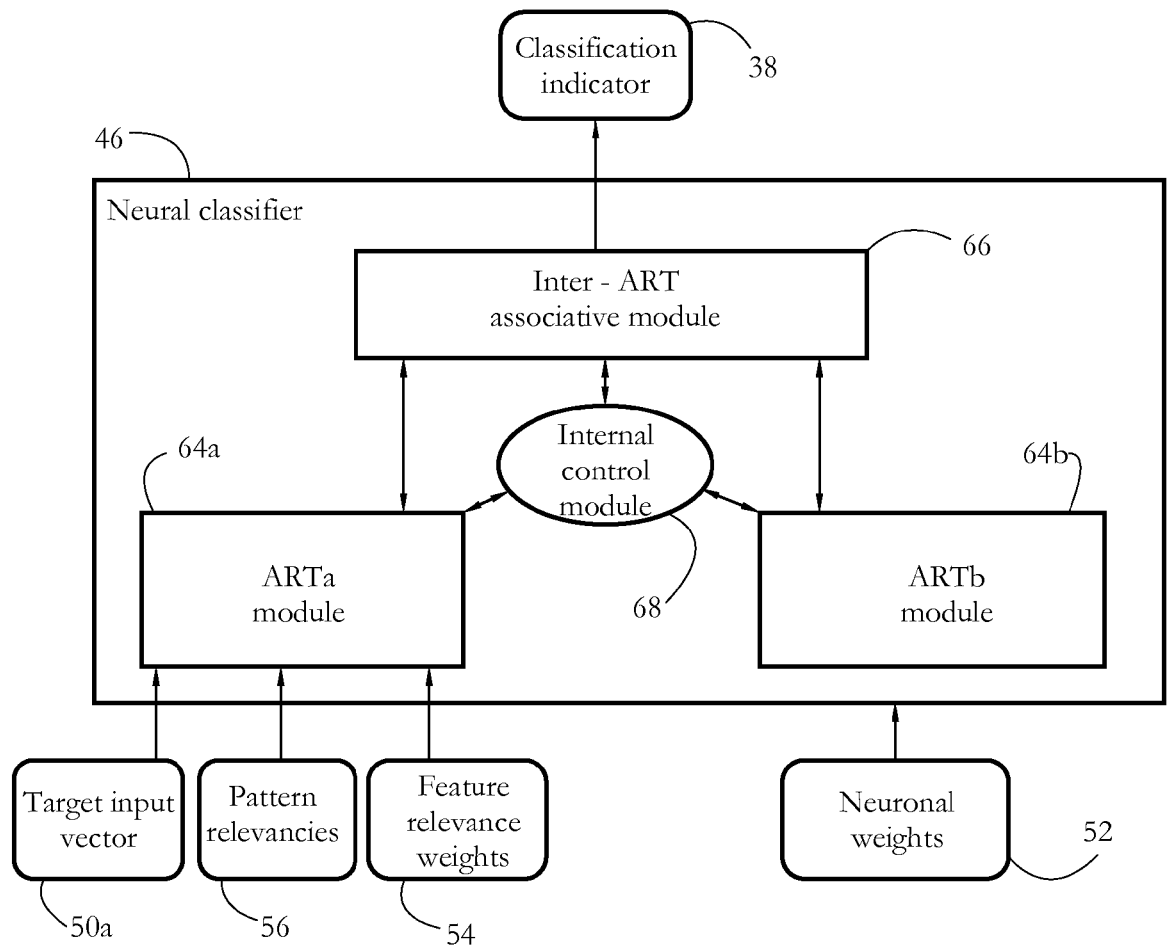
FIG. 5 illustrates an exemplary ARTMAP implementation of a neural classifier of FIG. 4, according to some embodiments of the present invention.

FIG. 5 shows an exemplary ARTMAP implementation of neural classifier 46 according to some embodiments of the present invention. Neural classifier 46 comprises an ARTa module 64a, an ARTb module 64b, an inter-ART associative module 66 connected to modules 64a-b, and an internal control module 68 connected to modules 64a-b and 66. In some embodiments, ARTa module 64a may include a relatively large number (e.g. hundreds) of neurons corresponding to automatically-generated message categories established through a training process, whose outputs are mapped by associative module 66 to a relatively limited number of designer-defined message classes (e.g., spam and ham) established by ARTb module 64b.

Figure 6:
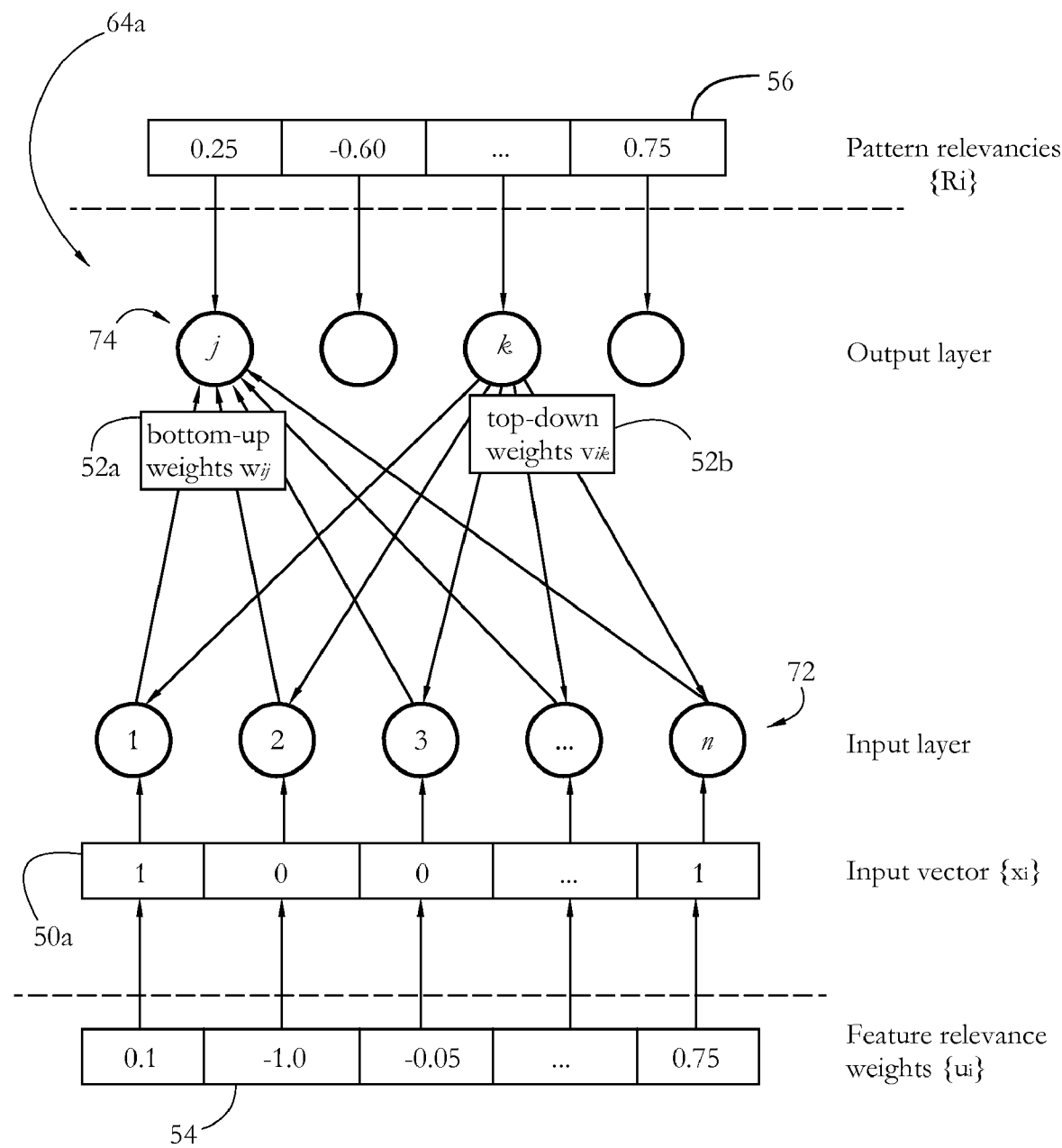
FIG. 6 shows a detail of an exemplary ART module forming part of a neural classifier of FIG. 5, including input and output neuronal layers according to some embodiments of the present invention.

FIG. 6 illustrates an exemplary subsystem of ARTa module 64a according to some embodiments of the present invention. Module 64a includes a set of input neurons 72 and a set of output neurons 74 connected to input neurons 72. In some embodiments, the strength of inter-neuronal connections is described by neuronal weights 52, comprising a set of bottom-up weights 52a and a set of top-down weights 52b. In some embodiments, each input neuron 72 corresponds to an element of target input vector 50a, and each output neuron 74 may store a specific category of input data. In some embodiments, each category stored by output neurons 74 may correspond to a distinct pattern of message features (e.g., output neuron j may be activated by all email messages which contain the word "Viagra", an internet link, and no attached images).

Each output neuron 74 (FIG. 6) may have an associated pattern relevance 56. In some embodiments, pattern relevance 56 attached to an output neuron is a number between 0 and 1, indicating the relevance to a particular message class (e.g. spam) of the particular combination (pattern) of message features that activate the respective output neuron. For example, the message feature pattern: "message contains the word 'Viagra' AND message contains a link AND message contains an image" may be more representative for spam than the feature pattern: "message contains the word Viagra AND the layout of the message is letter-like." Therefore, in some embodiments, the former feature pattern may receive a higher pattern relevance 56 than the latter pattern. In some embodiments, pattern relevancies 56 are computed through a training process at filter training system 12, as described below.

Each input neuron 72 (FIG. 6) may receive a corresponding feature relevance weight 54. In some embodiments, weights 54 are numbers indicating the degree to which each message feature is relevant to a particular message class (e.g. spam). For example, the presence of the word "Viagra" may not always indicate a spam message, whereas a blacklisted sender may be a consistently strong indication of spam. Therefore, the message feature "message contains the word Viagra" may receive a lower feature relevance weight than the message feature "blacklisted sender." In an embodiment with two message classes (spam and ham), the feature relevance weight corresponding to input neuron i may be given as:

$$u_i = \epsilon_i r_i, \quad [1]$$

wherein $r_i$ may be a number between 0 and $r_{max}$ (an exemplary value $r_{max} = 30$ may be used in some embodiments) indicating the relevance of the i-th message feature from the ordered list of message features, and wherein $\epsilon_i$ is 1 or −1, depending on whether the i-th message feature is spam or ham-identifying, respectively. In some embodiments, a message feature may be both spam- and ham-identifying, and its spam-identifying and ham-identifying feature relevance weights need not be constrained to have a particular relationship to each other. In some embodiments, feature relevance weights 54 are changeable during the operation of a given system as indicated by a human operator, and are not subject to a neural training process.

Figure 7:
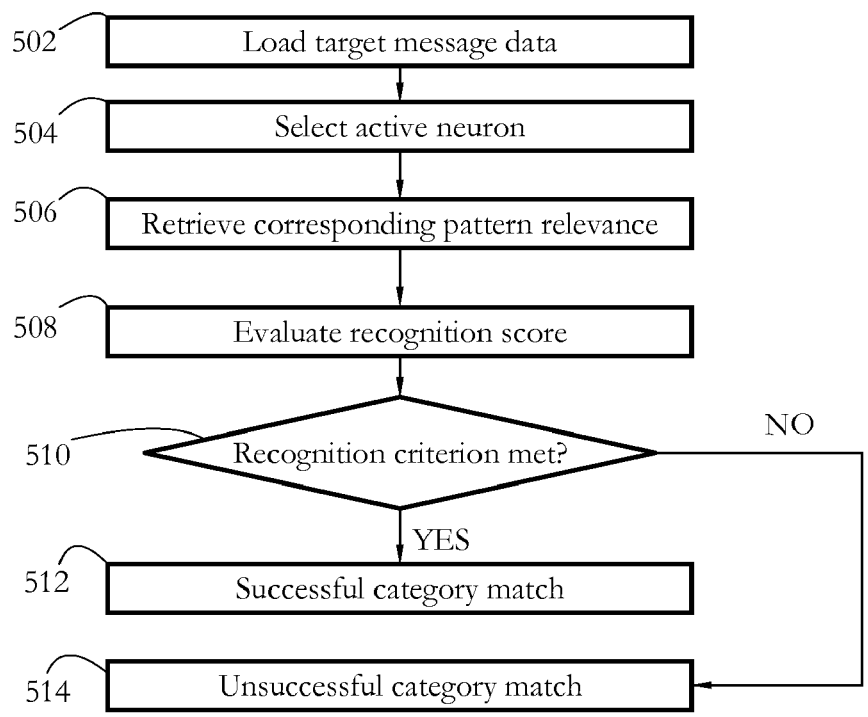
FIG. 7 illustrates an exemplary flowchart of a neural classifier according to some embodiments of the present invention.

FIG. 7 shows an exemplary sequence of steps describing the operation of neural classifier 46 according to some embodiments of the present invention. In a step 502, neural classifier 46 may load the data associated with target message 40a, comprising target input vector 50a, from message parser 44. In a step 504, neural classifier 46 may perform a sequence of operations resulting in the activation of a subset of neurons. In an embodiment implementing an ART or ARTMAP configuration of classifier 46, step 504 may comprise the multiplication of target input vector 50a with bottom-up weights 52a (FIG. 6), and the selection (also termed activation) of an output neuron j which closely matches input vector 50a. In a step 506, neural classifier 46 retrieves the pattern relevance corresponding to the active neuron j from the set of pattern relevancies 56. Next, in a step 508, neural classifier 46 evaluates a recognition score. In some embodiments, the recognition score may be computed as a weighted average:

$$\Sigma_1 = \alpha_1 R_{NN} + \alpha_2 R_j, \quad [2]$$

wherein $\alpha_1, \alpha_2 \in [0, 1]$ and $\alpha_1 + \alpha_2 = 1$, wherein $R_j$ is the pattern relevance corresponding to the active neuron, and wherein $R_{NN}$ is a neural recognition score computed by the neural network. In an ART or ARTMAP embodiment, $R_{NN}$ may be calculated as:

$$R_{NN} = \frac{\sum_{i=1}^{n} x_i v_{ij}}{\|x\|}, \quad [3]$$

wherein $x_i$ and $\mu x \mu$ are the n elements and the norm of target input vector 50a, respectively, and wherein $v_{ij}$ are the top-down weights 52b of the active neuron j (FIG. 6). Computer experiments found that values of $\alpha_1 = 0.3$, $\alpha_2 = 0.7$ provided an exemplary suitable tradeoff between spam/ham detection and selectivity.

In some embodiments, the recognition score is evaluated as:

$$\Sigma_2 = \alpha_1 R_{NN} + \alpha_2 R_j + \alpha_3 R_F \quad [4]$$

wherein $\alpha_1, \alpha_2, \alpha_3 \in [0, 1]$ and $\alpha_1 + \alpha_2 + \alpha_3 = 1$, wherein $R_{NN}$ is computed according to Eqn. [3], $R_j$ is the pattern relevance corresponding to the active neuron, and wherein $R_F$ is a relevance computed according to feature relevance weights 54. In some embodiments, $R_F$ is given by:

$$R_F = \sum_{i=1}^{n} x_i u_i \quad [5]$$

wherein $x_i$ are the n elements of vector 50a, and $u_i$ are the respective feature relevance weights 54 (see FIG. 6 and Eqn. [1]). In some embodiments, $R_F$ is scaled to a value between 0 and 1, wherein a value of 1 may indicate a strong relevance to spam, and a value of 0 may indicate a strong relevance to ham.

In some embodiments, $R_F$ is computed according to the following formula:

$$R_F = \frac{1 + S - H}{2} \quad [6]$$

wherein S is the spam relevance and H is the ham relevance of target message 40a, respectively. In some embodiments, $$S = \sum_{\text{spam-id.features } i} x_i r_i / r_{max},$$

wherein summation proceeds over spam-identifying features only, while $$H = \sum_{\text{ham-id.features } k} x_k r_k / r_{max},$$

wherein summation proceeds over ham-identifying features only. In some embodiments, S and H are scaled to values between 0 and 1. For example, if the formula for S or H returns a value greater than 1, the respective value may be set to 1. Computer experiments of a method using Eqn. [4] found that values $\alpha_1 = 0.3$, $\alpha_2 = 0.28$, and $\alpha_3 = 0.42$ provided an exemplary suitable tradeoff between spam/ham detection and selectivity. The exemplary values of $\alpha_1 = 0.3$, $\alpha_2 = 0.28$, and $\alpha_3 = 0.42$ may be generated by starting with exemplary values $\alpha_1 = 0.3$ and $\alpha'_2 = 0.7$, and setting $\alpha_2 = \alpha'_2 \ast 0.4 = 0.7 \ast 0.4 = 0.28$ and $\alpha_3 = \alpha'_2 \ast 0.6 = 0.7 \ast 0.6 = 0.42$.

In a step 510 (FIG. 7), neural classifier 46 checks whether a recognition criterion is met. In an ART or ARTMAP embodiment, recognition score $\Sigma_1$ and/or $\Sigma_2$ may be compared to a predefined vigilance threshold. If the recognition score exceeds the vigilance threshold, neural classifier 46 proceeds on to a step 512, wherein target message 40a is recognized as belonging to the message category of the active neuron j. In some embodiments, associative module 66 then assigns message 40a to the appropriate message class (e.g. spam or non-spam). If the recognition score falls below the vigilance threshold, in a step 514 neural classifier 46 may conclude that message 40a does not match any existing message category and may output an appropriate classification indicator (e.g., "undecided", or "I don't know").

Figure 8:
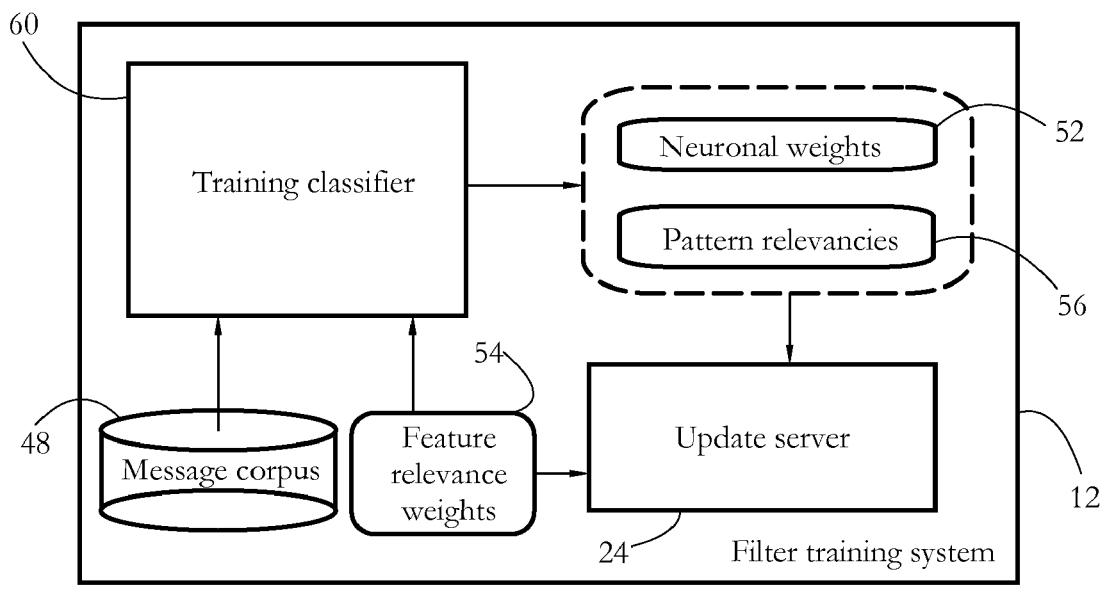
FIG. 8 shows a diagram of an exemplary filter training system of FIGS. 1A-B, including a training classifier and update server according to some embodiments of the present invention.

FIG. 8 shows a diagram of an exemplary filter training system of FIGS. 1A-B, according to some embodiments of the present invention. Filter training system 12 includes a training classifier 60 computer system and an update server 24 connected to training classifier 60. Training classifier 60 is configured to generate a set of neuronal weights 52 and a set of pattern relevancies 56 by running a training process comprising the analysis of a message corpus 48 according to a set of externally-supplied feature relevance weights 54. In some embodiments, message corpus 48 includes a collection of email messages sorted and indexed into a number of distinct classes (e.g. spam and non-spam). In some embodiments, each message belonging to message corpus 48 may include a classification indicator showing the class assignment of the respective message. Message corpus 48 may be kept up to date by the addition of newly received messages. In some embodiments, message corpus 48 may reside on training classifier 60, on other computer systems, or on computer readable media forming part of filter training system 12. Some embodiments of training classifier 60 are configured to input feature relevance weights 54 from a source external to any system neural network (e.g., from a human operator), in the form of a data file or through a computer interface. Update server 24 makes neuronal weights 52, pattern relevancies 56, and feature relevance weights 54 available to message classifiers 30, 1030 over network 16 (FIG. 1). In some embodiments, training classifier 60 may repeat the training process on a periodic basis or on-demand, so that eventual changes in message corpus 48 are reflected in neuronal weights 52 and pattern relevancies 56.

Figure 9:
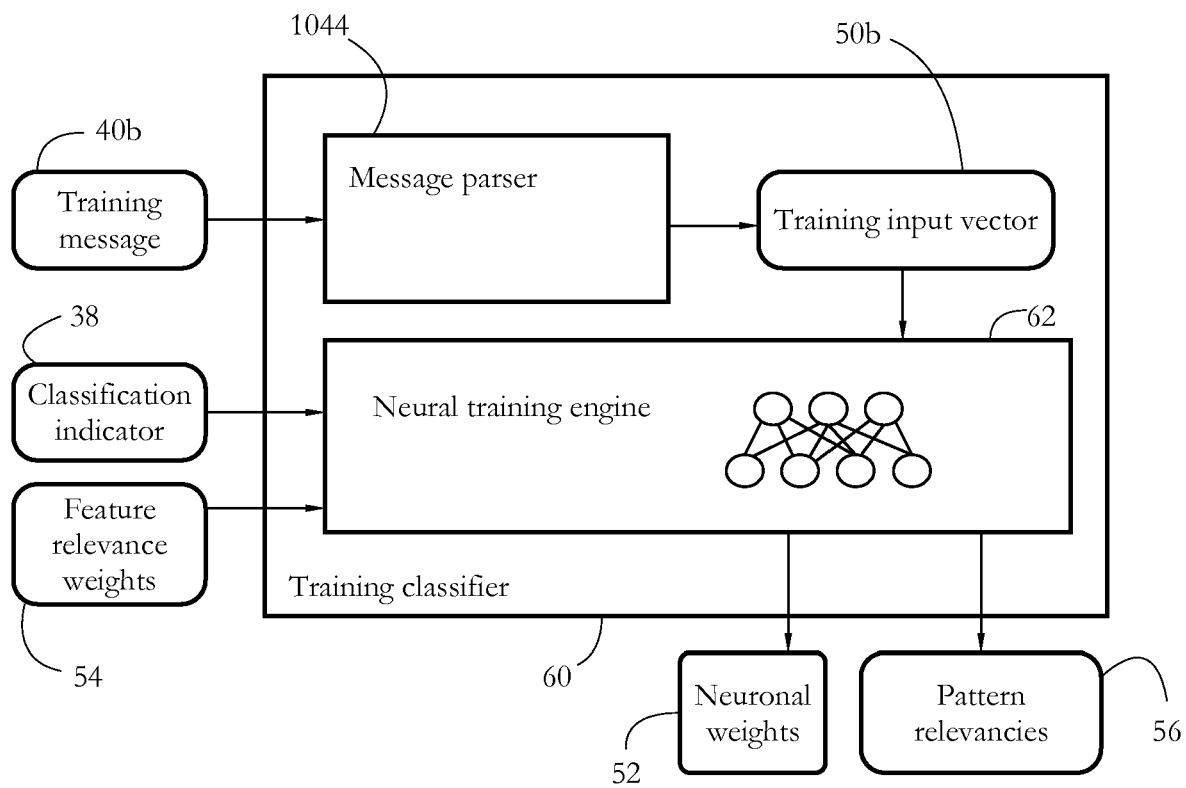
FIG. 9 shows an exemplary diagram of a training classifier of FIG. 8, having a message parser and a neural training engine according to some embodiments of the present invention.

FIG. 9 shows a diagram of an exemplary training classifier according to some embodiments of the present invention. Training classifier 60 comprises a message parser 1044 and a neural training engine 62 connected to message parser 1044. Message parser receives a training message 40b from message corpus 48 and outputs a corresponding training input vector 50b to neural training engine 62. The operation of message parser 1044 may be similar to that of parser 44 forming part of neural network filter 34 (FIG. 4). Neural training engine 62 is configured to receive training input vector 50b, classification indicator 38 showing the class assignment of training message 40b, and feature relevance weights 54, and to generate neuronal weights 52 and pattern relevancies 56 through a neural training process described below.

Figure 10:
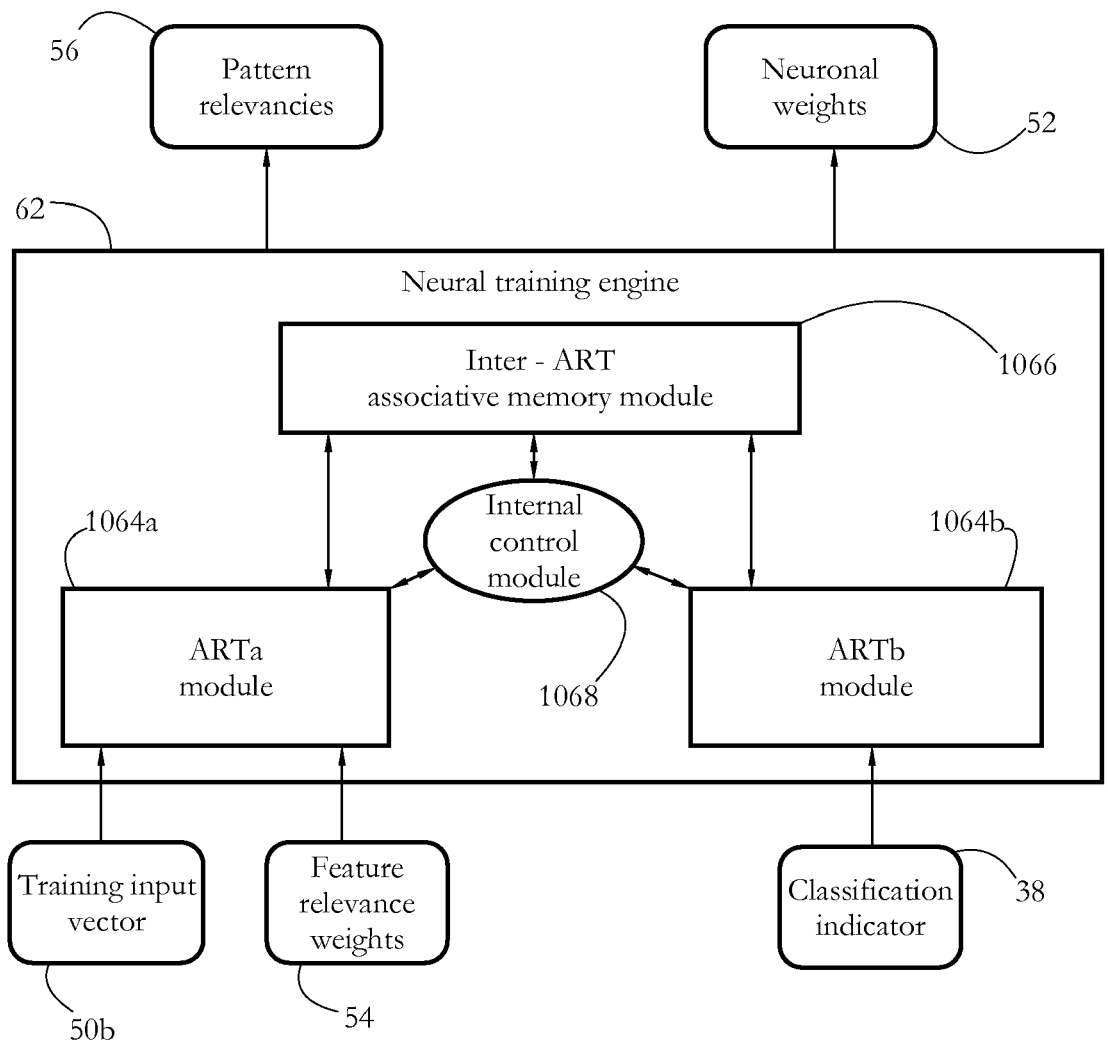
FIG. 10 shows an exemplary ARTMAP implementation of a training classifier of FIG. 9 according to some embodiments of the present invention.

FIG. 10 shows an exemplary ARTMAP implementation of neural training engine 62 according to some embodiments of the present invention. Neural training engine 62 comprises an ARTa module 1064a, an ARTb module 1064b, an inter-ART associative module 1066 connected to modules 1064a-b, and an internal control module 1068 connected to modules 1064a-b and 1066. ARTa module 1064a comprises a set of artificial neurons configured to receive training input vector 50b and feature relevance weights 54, and to automatically construct (self-organize) a set of message categories and their corresponding pattern relevancies 56. In some embodiments, each message category is defined by a certain combination (pattern) of message features, and is associated to a pattern relevance. In some embodiments, the structure of ARTa module 1064a is the same as that of ARTa module 64a of neural classifier 46 (FIG. 6). ARTb module 1064b comprises a set of artificial neurons configured to receive classification indicator 38 corresponding to each training message 40b, and to automatically construct message classes (e.g. spam and ham). In some embodiments, associative module 1066 provides a mapping between message categories produced by ARTa module 1064a and message classes produced by ARTb module 1064b. All operational parameters of neural training engine 62 including neuronal weights of modules 1064a-b, optimized as a result of the training process, are exported as the set of neuronal weights 52.

Figure 11:
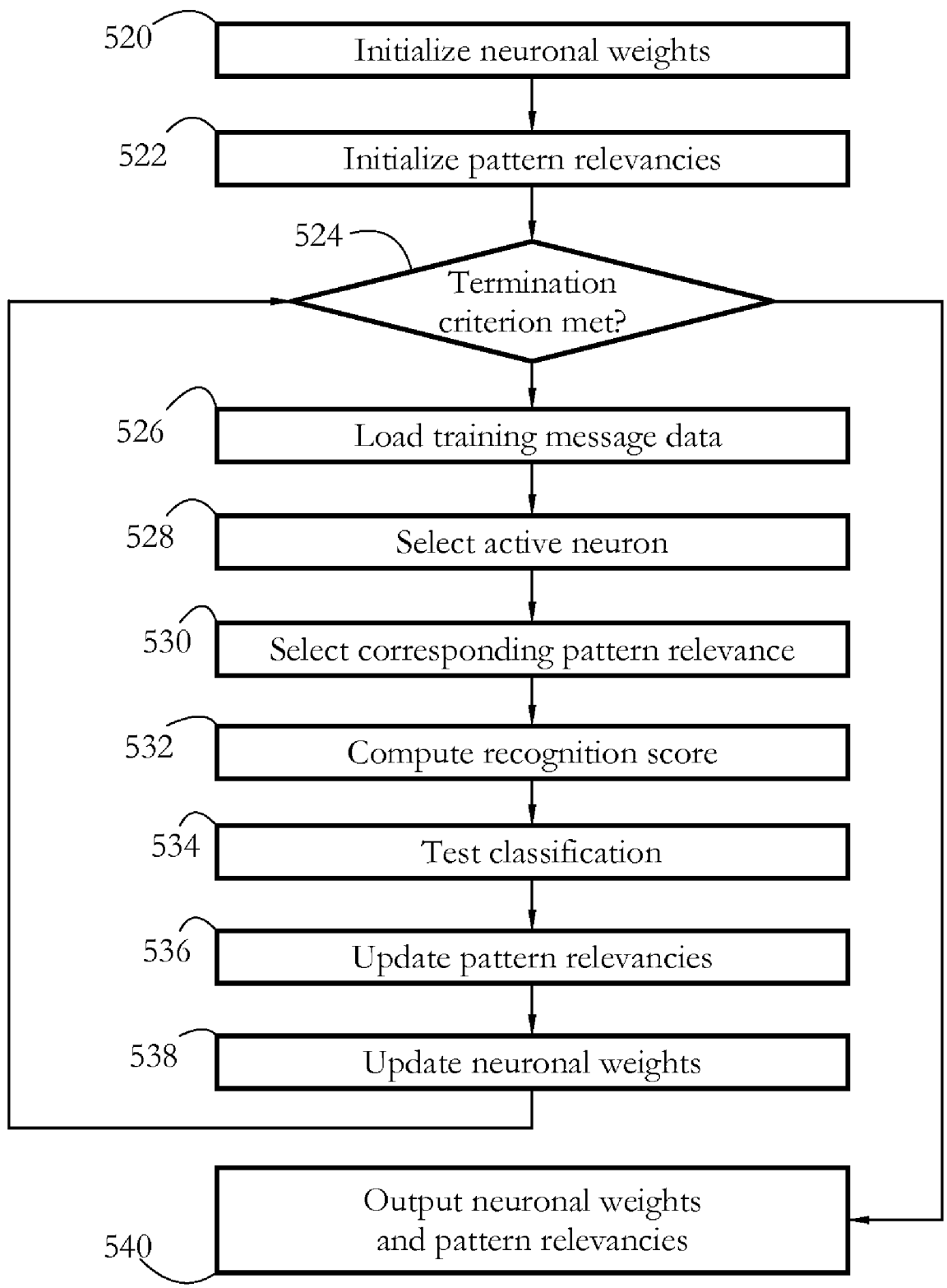
FIG. 11 illustrates an exemplary flowchart of a training classifier according to some embodiments of the present invention.

FIG. 11 shows an exemplary sequence of steps describing the operation of neural training engine 62 according to some embodiments of the present invention. In a step 520, engine 62 may initialize neuronal weights of both ARTa and ART modules 1064a-b. In some embodiments, weight initialization proceeds according to conventional ART and/or ARTMAP algorithms. In a step 522, engine 62 may initialize pattern relevancies 56. In some embodiments, neuronal weights and/or pattern relevancies are initialized to the respective values obtained in a previous training process. In some embodiments, initial values of pattern relevancies 56 are computed according to feature relevance weights 54. For example, the initial pattern relevance of an output neuron m belonging to ARTa module 1064a may be calculated as follows:

$$R_m(0) = \frac{1 + S^{(m)} - H^{(m)}}{2} \quad [7]$$

wherein $R_m(t)$ denotes the pattern relevance of neuron m at training step t (here t=0), and wherein $S^{(m)}$ is the spam relevance and $H^{(m)}$ is the ham relevance of the feature pattern corresponding to neuron m, respectively. In some embodiments, $$S^{(m)} = \sum_{spam-id.features\ i} x_i^{(m)} r_i / r_{max},$$

wherein summation is done only over the spam-identifying features, while $$H^{(m)} = \sum_{ham-id.features\ k} x_k^{(m)} r_k / r_{max},$$

wherein summation is done only over ham-identifying features. Here $x_i^{(m)}$ is the i-th element of the input vector associated to the message that activates neuron m, $r_i$ is the relevance of the i-th message feature, and $r_{max}$ is a maximum value for feature relevancies (refer to Eqn. [1]). In some embodiments, $S^{(m)}$ and $H^{(m)}$ are scaled to values between 0 and 1; if the formula for $S^{(m)}$ or $H^{(m)}$ returns a value greater than 1, the respective value is set to 1.

Next, engine 62 may loop through a sequence of steps 524-538 (FIG. 11) until a condition for the termination of the training process is met. In some embodiments, training is terminated after all training messages belonging to message corpus 48 have been processed, or after a certain period of time has elapsed.

In a step 526, corpus message data comprising training input vector 50b is received from message parser 1044. In a step 528, training engine 62 may perform a sequence of operations resulting in the activation of a subset of neurons. In an embodiment implementing an ART or ARTMAP architecture (e.g. FIG. 6), step 528 may comprise the scalar multiplication of vector 50b with bottom-up weights 52a, and the selection of an output neuron j matching training input vector 50. In a step 530, neural training engine 62 may retrieve the pattern relevance $R_j(t)$ corresponding to the active neuron j from the set of pattern relevancies 56. Next, in a step 532, a recognition score is evaluated. In some embodiments, the recognition score may be computed as a weighted average:

$$\Sigma_1 = \alpha_1 R_{NN} + \alpha_2 R_j(t), \quad [8]$$

wherein $\alpha_1, \alpha_2 \in [0, 1]$ and $\alpha_1 + \alpha_2 = 1$, and wherein $R_{NN}$ is a neural recognition score computed by the neural network, Eqn. [3]. In some embodiments, the recognition score may be computed as:

$$\Sigma_2 = \alpha_1 R_{NN} + \alpha_2 R_j(t) + \alpha_3 R_F \quad [9]$$

wherein $R_F$ is computed according to Eqn. [6]. In some embodiments, parameters $\alpha_1, \alpha_2$, and $\alpha_3$ have the same values as the respective parameters used by neural classifier 46 (e.g., $\alpha_1=0.3$, $\alpha_2=0.7$ in Eqn. [8] and $\alpha_1=0.3$, $\alpha_2=0.7$, $\alpha_3=0.4$ in Eqn. [9]).

In a step 534, neural training engine 62 tests whether a pattern recognition criterion is met. In an ART or ARTMAP embodiment, recognition score $\Sigma_1$ and/or $\Sigma_2$ may be compared to a predefined vigilance threshold. Also, in some embodiments, associative memory module 1066 may assign training message 40b to either the spam or the ham class. Next, in a step 536 engine 62 may update pattern relevance 56 corresponding to the active neuron j depending on the result of the pattern recognition test. If the recognition score exceeds the vigilance threshold and training message 40b is correctly classified (e.g. spam or ham), engine 62 may increase pattern relevance $R_j$ by an amount $\delta$:

$$R_j(t+1) = R_j(t) + \delta. \quad [10]$$

If the recognition score is below the vigilance threshold, or if training message 40b is misclassified, engine 62 may decrease pattern relevance $R_j$:

$$R_j(t+1) = R_j(t) - \delta. \quad [11]$$

The value $\delta$ may be chosen according to desired increment/decrement precision levels. For example, in some embodiments $\delta$ may be set to be about 0.001.

In a step 538, engine 62 may update other parameters such as neuronal weights 52 of modules 1064a-b, according to the result of the pattern recognition test. In some embodiments, weight update proceeds according to conventional ART and/or ARTMAP algorithms. For example, step 538 may comprise changing the top-down and/or bottom-up weights of the active neuron, or resetting a subset of neuronal weights in case of misclassification. In a step 540, neural training engine 62 outputs neuronal weights 52 and pattern relevancies 56 upon termination of the training process.

The exemplary systems and methods described above allow training a message classification system such as an anti-spam filter to classify new email messages into spam and non-spam classes. Such systems and methods may employ neural network technology to learn a set of frequently occurring patterns of spam/ham differentiating message features (e.g., the presence of certain keywords within the message body, the presence or absence of certain message headers, or a particular message layout), and to combine multiple spam heuristics. Externally-imposed feature relevance weights are defined, which modulate the internally-generated, conventional neuronal weights obtained through a training process of the network. This allows an operator greater control over the performance of the message classifier, since different spam heuristics may be given different importance levels in the classification decision according to the experience of the human operator.

Feature relevance weights may be defined separately for both spam- and ham-identifying message features, potentially reducing the rate of misclassification (especially false positives, i.e. legitimate messages mistakenly classified as spam).

Exemplary systems and methods as described above allow improved flexibility of the message classifier. At any time during operation, if a particular message heuristic (either spam- or ham-identifying) becomes unreliable, it may be effectively shut off by lowering its feature relevance weight, without otherwise changing the rest of the neural network or the relevance of other heuristics. From the client's perspective, any modification in the relevance of various spam/ham heuristics only requires a relatively small file update. Common feature relevance/pattern relevance file sizes may be on the order of several tens of kilobytes, as opposed to several megabytes for all other network parameters such as neuronal weights.

To illustrate the operation of an exemplary message classification system as described above, a simulation was conducted using a message corpus comprising about 2.5 million spam messages and about 1 million legitimate messages. 75% of the corpus was used to train the classifier, and the rest of 25% was used for testing the classification performance. An embodiment of the present invention was compared to an ARTMAP-based classifier not using feature relevance weights or pattern relevancies. The results are summarized in Table 1 (all numbers approximate):

|  | ARTMAP | Exemplary embodiment of invention |
| --- | --- | --- |
| False positive rate | 1% | 1 in a million |
| False negative rate | 10% | 13% |

Although the exemplary methods and systems provided a slight increase of the false negative rate (i.e. a few more spam messages went undetected), it is commonly more important and more difficult to reduce false positives (i.e. to prevent tagging a legitimate email message as spam).

It will be clear to one skilled in the art that the above embodiments may be altered in many ways without departing from the scope of the invention. Accordingly, the scope of the invention should be determined by the following claims and their legal equivalents.

What is claimed is:

1. A spam filtering method comprising employing a computer system to perform the steps of:
   computing a set of pattern relevancies for a set of feature patterns, wherein at least one pattern relevance of the set of pattern relevancies is computed according to a set of feature relevance weights determined through a process external to neuronal training; and
   classifying a target message as spam or ham according to a result of a processing of the target message by a neural network filter according to the set of pattern relevancies by:
      assigning a pattern relevance of the set of pattern relevancies to each neuron of a subset of neurons of the neural network filter;
      computing a target input vector characterizing the presence of a set of spam/ham identifying message features within the target message;
      selecting an active neuron of the subset of neurons according to a scalar product between the target input vector and a first set of neuronal weights of the neural network filter;
      computing a recognition score according to a scalar product between the target input vector and a second set of neuronal weights of the neural network filter, and according to the pattern relevance corresponding to the active neuron; and
      comparing the recognition score to a predefined vigilance threshold.

2. The method of claim 1, comprising computing the at least one pattern relevance according to a training input vector characterizing the presence of the set of spam/ham identifying message features within a training message, and wherein the at least one pattern relevance is substantially equal to:

$$R = \sum_{i=1}^{n} x_i u_i,$$

wherein R is the at least one pattern relevance, wherein $x_i$ is the i-th element of the training input vector, wherein $u_i$ is the feature relevance weight corresponding to the i-th message feature of the set of spam/ham identifying message features, and wherein n is the length of the training input vector.

3. The method of claim 1, comprising computing the at least one pattern relevance according to a training input vector characterizing the presence of the set of spam/ham identifying message features within a training message, and wherein the at least one pattern relevance is substantially equal to:

$$R = \frac{1 - H + S}{2},$$

wherein R is the at least one pattern relevance, wherein H is substantially equal to $$H = \sum_{ham-id.\,features\,k} x_k r_k / r_{max},$$

wherein S is substantially equal to $$S = \sum_{spam-id.\,features\,i} x_i r_i / r_{max},$$

wherein $x_i$, $x_k$ are the i-th and k-th elements of the training input vector, respectively, wherein $r_i$, $r_k$ are the feature relevance weights corresponding to an i-th and k-th message features of the set of spam/ham identifying features, wherein the i-th message feature is spam-identifying, wherein the k-th message feature is ham-identifying, and wherein $r_{max}$ is a positive parameter.

4. The method of claim 1, wherein computing the at least one pattern relevance comprises:
- assigning a training pattern relevance to each neuron of the subset of neurons of the neural network filter;
- for each training message of a message corpus,
  computing a training input vector characterizing a presence of a set of spam/ham identifying message features within said each training message;
  selecting a training active neuron of the subset of neurons according to a scalar product between the training input vector and a third set of neuronal weights of the neural network filter;
  computing a training recognition score according to a scalar product between the target input vector and a fourth set of neuronal weights of the neural network filter, and according to the training pattern relevance corresponding to the training active neuron;
  performing a test classification of said each training message as spam or ham;
  modifying the training pattern relevance of the training active neuron according to the training recognition score and a result of the test classification; and
- setting each pattern relevance of the set of pattern relevancies substantially equal to a corresponding training pattern relevance.

5. The method of claim 4, wherein the training recognition score is substantially equal to:

$$\Sigma_1 = \alpha_1 R_{NN} + \alpha_2 R_{act}$$

wherein $R_{NN}$ is substantially equal to $$R_{NN} = \frac{\sum_{i=1}^{n} x_i v_{i,act}}{\|x\|},$$

wherein $x_i$ and $\|x\|$ are the i-th element and the norm of the training input vector, respectively, wherein $v_{i,act}$ is the i-th element of the third set of neuronal weights, wherein $R_{act}$ is the training pattern relevance corresponding to the training active neuron, and wherein $\alpha_1$ and $\alpha_2$ are positive parameters so that $\alpha_1 + \alpha_2 = 1$.

6. The method of claim 4, wherein the training recognition score is substantially equal to:

$$\Sigma_2 = \alpha_1 R_{NN} + \alpha_2 R_{act} + \alpha_3 R_F$$

wherein $R_{NN}$ is substantially equal to $$R_{NN} = \frac{\sum_{i=1}^{n} x_i v_{i,act}}{\|x\|},$$

wherein $x_i$ and $\|x\|$ are the i-th element and the norm of the training input vector, respectively, wherein $v_{i,act}$ is the i-th element of the third set of neuronal weights, wherein $R_{act}$ is the training pattern relevance corresponding to the training active neuron, wherein $R_F$ is substantially equal to $$R_F = \frac{1 - H + S}{2},$$

wherein H is substantially equal to $$H = \sum_{ham-id.features\ k} x_k r_k / r_{max},$$

wherein S is substantially equal to $$S = \sum_{spam-id.features\ i} x_i r_i / r_{max},$$

wherein $x_i$, $x_k$ are the i-th and k-th elements of the training input vector, respectively, wherein $r_i$, $r_k$ are the feature relevance weights corresponding to an i-th and k-th message features of the set of spam/ham identifying features, wherein the i-th message feature is spam-identifying, wherein the k-th message feature is ham-identifying, wherein $r_{max}$ is a positive parameter, and wherein $\alpha_1$, $\alpha_2$, and $\alpha_3$ are positive parameters so that $\alpha_1 + \alpha_2 + \alpha_3 = 1$.

7. The method of claim 1, wherein the recognition score is substantially equal to:

$$\Sigma_1 = \alpha_1 R_{NN} + \alpha_2 R_{act}$$

wherein $R_{NN}$ is substantially equal to $$R_{NN} = \frac{\sum_{i=1}^{n} x_i v_{i,act}}{\|x\|},$$

wherein $x_i$ and $\|x\|$ are the i-th element and the norm of the target input vector, respectively, wherein $v_{i,act}$ is the i-th element of the second set of neuronal weights, wherein $R_{act}$ is the pattern relevance corresponding to the active neuron, and wherein $\alpha_1$ and $\alpha_2$ are positive parameters so that $\alpha_1 + \alpha_2 = 1$.

8. The method of claim 1, wherein the recognition score is substantially equal to:

$$\Sigma_2 = \alpha_1 R_{NN} + \alpha_2 R_{act} + \alpha_3 R_F$$

wherein $R_{NN}$ is substantially equal to $$R_{NN} = \frac{\sum_{i=1}^{n} x_i v_{i,act}}{\|x\|},$$

wherein $x_i$ and $\|x\|$ are the i-th element and the norm of the target input vector, respectively, wherein $v_{i,act}$ is the i-th element of the second set of neuronal weights, wherein $R_{act}$ is the pattern relevance corresponding to the active neuron, wherein $R_F$ is substantially equal to $$R_F = \frac{1 - H + S}{2},$$

wherein H is substantially equal to $$H = \sum_{ham-id.features\ k} x_k r_k / r_{max},$$

wherein S is substantially equal to $$S = \sum_{spam-id.features\ i} x_i r_i / r_{max},$$

wherein $x_i$, $x_k$ are the i-th and k-th elements of the target input vector, respectively, wherein $r_i$, $r_k$ are the feature relevance weights corresponding to an i-th and k-th message features of the set of spam/ham identifying features, wherein the i-th message feature is spam-identifying, wherein the k-th message feature is ham-identifying, wherein $r_{max}$ is a positive parameter, and wherein $\alpha_1$, $\alpha_2$, and $\alpha_3$ are positive parameters so that $\alpha_1 + \alpha_2 + \alpha_3 = 1$.

9. A non-transitory computer-readable medium storing instructions, which, when executed by a computer system, cause the computer system to form:
   a training classifier configured to compute a set of pattern relevancies for a set of feature patterns, wherein at least one pattern relevance of the set of pattern relevancies is computed according to a set of feature relevance weights determined through a process external to neuronal training; and
   a neural network filter configured to classify a target message as spam or ham according to the set of pattern relevancies by
      assigning a pattern relevance of the set of pattern relevancies to each neuron of a subset of neurons of the neural network filter;
      computing a target input vector characterizing the presence of a set of spam/ham identifying message features within the target message;
      selecting an active neuron of the subset of neurons according to a scalar product between the target input vector and a first set of neuronal weights of the neural network filter;
      computing a recognition score according to a scalar product between the target input vector and a second set of neuronal weights of the neural network filter, and according to the pattern relevance corresponding to the active neuron; and
      comparing the recognition score to a predefined vigilance threshold.

10. The system of claim 9, wherein the training classifier is configured to compute the at least one pattern relevance according to a training input vector characterizing the presence of the set of spam/ham identifying message features within a training message, and wherein the at least one pattern relevance is substantially equal to:

$$R = \sum_{i=1}^{n} x_i u_i,$$

wherein R is the at least one pattern relevance, wherein $x_i$ is the i-th element of the training input vector, wherein $u_i$ is the feature relevance weight corresponding to the i-th message feature of the set of spam/ham identifying message features, and wherein n is the length of the training input vector.

11. The system of claim 9, wherein the training classifier is configured to compute the at least one pattern relevance according to a training input vector characterizing the presence of the set of spam/ham identifying message features within a training message, and wherein the at least one pattern relevance is substantially equal to:

$$R = \frac{1 - H + S}{2},$$

wherein R is the at least one pattern relevance, wherein H is substantially equal to $$H = \sum_{ham-id.features\ k} x_k r_k / r_{max},$$

wherein S is substantially equal to $$S = \sum_{spam-id.features\ i} x_i r_i / r_{max},$$

wherein $x_i$, $x_k$ are the i-th and k-th elements of the training input vector, respectively, wherein $r_i$, $r_k$ are the feature relevance weights corresponding to an i-th and k-th message features of the set of spam/ham identifying features, wherein the i-th message feature is spam-identifying, wherein the k-th message feature is ham-identifying, and wherein $r_{max}$ is a positive parameter.

12. The system of claim 9, wherein the training classifier is configured to:
   assign a training pattern relevance to each neuron of a subset of training neurons of the training classifier;
   for each training message of a message corpus,
      compute a training input vector characterizing the presence of a set of spam/ham identifying message features within the each training message;
      select an active training neuron of the subset of training neurons according to a scalar product between the training input vector and a first set of neuronal weights of the training classifier;
      compute a training recognition score according to a scalar product between the target input vector and a second set of neuronal weights of the training classifier, and according to the initial training pattern relevance corresponding to the active training neuron;
      perform a test classification of the each training message as spam or ham;
      modify the training pattern relevance of the active training neuron according to the training recognition score and a result of the test classification; and
   set the pattern relevancies substantially equal to the training pattern relevancies, respectively.

13. The system of claim 12, wherein the training classifier is configured to compute the recognition score according to:

$$\Sigma_1 = \alpha_1 R_{NN} + \alpha_2 R_{act},$$

wherein $\Sigma_1$ is the training recognition score, wherein $R_{NN}$ is substantially equal to $$R_{NN} = \frac{\sum_{i=1}^{n} x_i v_{i,act}}{\|x\|},$$

wherein $x_i$ and μxμ are the i-th element and the norm of the training input vector, respectively, wherein $v_{i,act}$ is the i-th element of the second set of neuronal weights of the training classifier, wherein $R_{act}$ is the training pattern relevance corresponding to the training active neuron, and wherein $\alpha_1$ and $\alpha_2$ are positive parameters so that $\alpha_1+\alpha_2=1$.

14. The system of claim 12, wherein the training classifier is configured to compute the training recognition score according to:

$$\Sigma_2=\alpha_1 R_{NN}+\alpha_2 R_{act}+\alpha_3 R_F$$

wherein $\Sigma_2$ is the training recognition score, wherein $R_{NN}$ is substantially equal to $$R_{NN} = \frac{\sum_{i=1}^{n} x_i v_{i,act}}{\|x\|},$$

wherein $x_i$ and μxμ are the i-th element and the norm of the training input vector, respectively, wherein $v_{i,act}$ is the i-th element of the second set of neuronal weights of the training classifier, wherein $R_{act}$ is the training pattern relevance corresponding to the training active neuron, wherein $R_F$ is substantially equal to $$R_F = \frac{1-H+S}{2},$$

wherein H is substantially equal to $$H = \sum_{ham-id.features\ k} x_k r_k / r_{max},$$

wherein S is substantially equal to $$S = \sum_{spam-id.features\ i} x_i r_i / r_{max},$$

wherein $x_i$, $x_k$ are the i-th and k-th elements of the training input vector, respectively, wherein $r_i$, $r_k$ are the feature relevance weights corresponding to an i-th and k-th message features of the set of spam/ham identifying features, wherein the i-th message feature is spam-identifying, wherein the k-th message feature is ham-identifying, wherein $r_{max}$ is a positive parameter, and wherein $\alpha_1$, $\alpha_2$, and $\alpha_3$ are positive parameters so that $\alpha_1+\alpha_2+\alpha_3=1$.

15. The system of claim 9, wherein the neural network filter is configured to compute the recognition score according to:

$$\Sigma_1=\alpha_1 R_{NN}+\alpha_2 R_{act}$$

wherein $\Sigma_1$ is the recognition score, wherein $R_{NN}$ is substantially equal to $$R_{NN} = \frac{\sum_{i=1}^{n} x_i v_{i,act}}{\|x\|},$$

wherein $x_i$ and μxμ are the i-th element and the norm of the target input vector, respectively, wherein $v_{i,act}$ is the i-th element of the second set of neuronal weights of the neural network filter, wherein $R_{act}$ is the pattern relevance corresponding to the active neuron, and wherein $\alpha_1$ and $\alpha_2$ are positive parameters so that $\alpha_1+\alpha_2=1$.

16. The system of claim 9, wherein the neural network filter is configured to compute the recognition score according to:

$$\Sigma_2=\alpha_1 R_{NN}+\alpha_2 R_{act}+\alpha_3 R_F$$

wherein $\Sigma_2$ is the recognition score, wherein $R_{NN}$ is substantially equal to $$R_{NN} = \frac{\sum_{i=1}^{n} x_i v_{i,act}}{\|x\|},$$

wherein $x_i$ and μxμ are the i-th element and the norm of the target input vector, respectively, wherein $v_{i,act}$ is the i-th element of the second set of neuronal weights of the neural network filter, wherein $R_{act}$ is the pattern relevance corresponding to the active neuron, wherein $R_F$ is substantially equal to $$R_F = \frac{1-H+S}{2},$$

wherein H is substantially equal to $$H = \sum_{ham-id.features\ k} x_k r_k / r_{max},$$

wherein S is substantially equal to $$S = \sum_{spam-id.features\ i} x_i r_i / r_{max},$$

wherein $x_i$, $x_k$ are the i-th and k-th elements of the target input vector, respectively, wherein $r_i$, $r_k$ are the feature relevance weights corresponding to an i-th and k-th message features of the set of spam/ham identifying features, wherein the i-th message feature is spam-identifying, wherein the k-th message feature is ham-identifying, wherein $r_{max}$ is a positive parameter, and wherein $\alpha_1$, $\alpha_2$, and $\alpha_3$ are positive parameters so that $\alpha_1+\alpha_2+\alpha_3=1$.

* * * * *